US011824320B2

(12) United States Patent
Yanagimachi et al.

(10) Patent No.: US 11,824,320 B2
(45) Date of Patent: Nov. 21, 2023

(54) OPTICAL AMPLIFIER, AND CONTROL METHOD THEREFOR

(71) Applicant: NEC Corporation, Tokyo (JP)

(72) Inventors: Shigeyuki Yanagimachi, Tokyo (JP); Emmanuel Le Taillandier De Gabory, Tokyo (JP)

(73) Assignee: NEC CORPORATION, Tokyo (JP)

( * ) Notice: Subject to any disclaimer, the term of this patent is extended or adjusted under 35 U.S.C. 154(b) by 282 days.

(21) Appl. No.: 17/431,822

(22) PCT Filed: Feb. 19, 2020

(86) PCT No.: PCT/JP2020/006425
§ 371 (c)(1),
(2) Date: Aug. 18, 2021

(87) PCT Pub. No.: WO2020/171103
PCT Pub. Date: Aug. 27, 2020

(65) Prior Publication Data
US 2022/0115830 A1 Apr. 14, 2022

(30) Foreign Application Priority Data

Feb. 22, 2019 (JP) .................................. 2019-030342

(51) Int. Cl.
*H04B 10/02* (2006.01)
*H01S 3/091* (2006.01)
(Continued)

(52) U.S. Cl.
CPC .......... *H01S 3/0912* (2013.01); *H01S 3/0014* (2013.01); *H01S 3/06737* (2013.01);
(Continued)

(58) Field of Classification Search
CPC .......... H04B 10/0795; H04B 10/07955; H04B 10/2581; H04B 10/0797; H04B 10/291;
(Continued)

(56) References Cited

U.S. PATENT DOCUMENTS 10,965,375 B2 * 3/2021 Ono ........................ H01S 3/067
2003/0152388 A1 8/2003 Uda et al.
(Continued)

FOREIGN PATENT DOCUMENTS

JP 2003-234701 A 8/2003
JP 2015-005667 A 1/2015
(Continued)

OTHER PUBLICATIONS

International Search Report for PCT Application No. PCT/JP2020/006425, dated Jun. 9, 2020.
(Continued)

*Primary Examiner* — Hanh Phan
(74) *Attorney, Agent, or Firm* — Sughrue Mion, PLLC

(57) ABSTRACT

An optical amplifier uses, in a gain medium, a multicore optical fiber having a plurality of cores, and comprises: an input-light power monitor that monitors the optical power of input light to the plurality of cores of the multicore optical fiber; an output-light power monitor that monitors the optical power of medium-passed output light from the plurality of cores that has passed through the multicore optical fiber; a crosstalk monitor that monitors the amount of inter-core crosstalk among the plurality of cores; and a controller that controls the pump-light power of pump light superimposed on the input light to the plurality of cores on the basis of the monitored optical power of input light, the monitored optical power of output light, and the monitored amount of inter-core crosstalk.

19 Claims, 15 Drawing Sheets

(51) Int. Cl.
*H01S 3/00* (2006.01)
*H01S 3/067* (2006.01)
*H01S 3/10* (2006.01)
*H04B 10/25* (2013.01)

(52) U.S. Cl.
CPC ...... *H01S 3/06754* (2013.01); *H01S 3/10069* (2013.01); *H04B 10/25* (2013.01)

(58) Field of Classification Search
CPC ............... H04B 10/293; H04B 10/294; H04B 10/2931; H04B 10/0973; H04J 14/04; H01S 3/06737; H01S 3/0912; H01S 3/0014
USPC ......... 398/173, 175, 177, 178, 181, 44, 141, 398/160, 158, 159, 33, 37, 38, 79, 143; 359/337, 341.1, 341.33, 341.4, 341.3, 359/341.02
See application file for complete search history.

(56) References Cited

U.S. PATENT DOCUMENTS

| | | | |
|---|---|---|---|
| 2014/0168756 A1* | 6/2014 | Zhu | H01S 3/06754 385/127 |
| 2014/0240819 A1 | 8/2014 | Tsuchida et al. | |
| 2015/0085352 A1* | 3/2015 | Ryf | H01S 3/06758 359/341.1 |
| 2015/0168642 A1 | 6/2015 | Mimura et al. | |
| 2016/0118762 A1 | 4/2016 | Tadakuma et al. | |

FOREIGN PATENT DOCUMENTS

| | | |
|---|---|---|
| JP | 2015-087614 A | 5/2015 |
| JP | 2017-188689 A | 10/2017 |
| WO | 2012/173271 A | 12/2012 |
| WO | 2013/051655 A1 | 4/2013 |

OTHER PUBLICATIONS

English translation of Written opinion for PCT Application No. PCT/JP2020/006425, dated Jun. 9, 2020.
JP Office Action for JP Application No. 2021-502066, dated Aug. 2, 2022 with English Translation.

* cited by examiner

OPTICAL AMPLIFIER, AND CONTROL METHOD THEREFOR

This application is a National Stage Entry of PCT/JP2020/006425 filed on Feb. 19, 2020, which claims priority from Japanese Patent Application 2019-030342 filed on Feb. 22, 2019, the contents of all of which are incorporated herein by reference, in their entirety.

TECHNICAL FIELD

The present invention relates to an optical amplifier and a control method therefor, and particularly relates to gain control of an optical fiber amplifier, and the like.

BACKGROUND ART

In recent years, traffic flowing through a network continues to rapidly increase by rapid spread of a portable terminal typified by a smartphone, and large-capacity data communication of a high-definition image or the like due to an advanced terminal. According to a certain investigation, total download traffic of broadband contractors in 2016 in Japan is approximately 8.3 Tbps, which continues to increase at an annual rate of approximately 52%, and an increase in traffic in the future is also expected. In contrast, in a core network that supports large-capacity communication, a technique for increasing capacity, such as wavelength division multiplexing (WDM) that multiplexes and transmits optical signals with a plurality of different wavelengths into one optical fiber, has been developed. However, since the number of wavelengths to be used in the WDM is limited, it is expected that an increase in communication capacity by the WDM reaches a limit in the near future.

In contrast, in recent years, for a purpose of increasing transmission capacity per one optical fiber, a multicore optical fiber in which a plurality of cores fill in one clad has been researched and developed. FIG. 1 illustrates a structure of a multicore optical fiber (multicore fiber (MCF)) of seven cores as one example. Note that, being classified broadly, a non-coupling MCF and a coupling MCF have been developed as the MCF. The non-coupling MCF is an optical fiber maintaining an interval between cores and having crosstalk between cores being suppressed. Since each core can be used as an independent optical transmission path in the non-coupling MCF, an optical communication technique developed for a conventional single mode optical fiber (single mode fiber (SMF)) can be used as it is. Meanwhile, the coupling MCF is an optical fiber having a short core interval and achieving a high core density. Since crosstalk occurs between cores in the coupling MCF, multi input multi output (MIMO) processing using a digital signal processor (DSP) and the like is needed in an optical receiver.

FIG. 2 illustrates a structure diagram of a non-coupling MCF of four cores and a coupling MCF of four cores as one example. Next, FIG. 3 illustrates a configuration of an optical network using an MCF. Note that a form of a network includes a point-point type in which transmission/reception nodes are disposed in such a way as to face each other, a ring type in which transmission/reception nodes are disposed on a circle, and a mesh type in which transmission/reception nodes are connected to each other in a mesh pattern, but only a portion related to a node at one transmission/reception end will be described for simplifying description herein. The optical network is configured to include a transponder (TPND) 503 as one example of a transmitter/receiver included in a transmission node and a reception node, a multicore optical fiber 501 as one example of an optical fiber being a transmission path, and a multicore optical fiber amplifier 502 as one example of an optical amplifier that compensates for an optical loss of the transmission path.

The present invention relates to a stable operation of an optical amplifier, and the optical amplifier will be described in detail. For a structure of a multicore erbium doped optical fiber amplifier (multicore erbium doped fiber amplifier (MC-EDFA)), a clad-collective pumping method of pumping a clad and collectively amplifying an optical signal in a core, and core individual pumping of individually pumping each core and amplifying an optical signal in the core are proposed, but an MC-EDFA of a core-individual-pumping method will be described as one example by using FIG. 4. The MC-EDFA of the core-individual-pumping method in FIG. 4 includes a coupling multicore erbium doped optical fiber (coupling MC-EDF) 51 being a gain medium, and a conversion medium (fan in: FI 53, fan out: FO 54) that connects an SMF 52 and the coupling MC-EDF 51 to each other. Furthermore, the MC-EDFA of the core-individual-pumping method in FIG. 4 includes a single mode pumping light source (single mode laser diode: SM-LD) 55 with a wavelength of 980 nm or 1480 nm, and a wavelength division multiplexing (WDM) coupler 56 for coupling the SM-LD 55 to the gain medium. Furthermore, the MC-EDFA of the core-individual-pumping method in FIG. 4 includes an input-light power monitor 57 and an output-light power monitor 58 as one example of an optical power monitor disposed on an input side and an output side, and a controller 59.

An operation of the MC-EDFA of the core-individual-pumping method in FIG. 4 will be described. An MCF optical transmission path (not illustrated) is temporarily converted into the SMF 52, an optical signal from the SM-LD 55 is superimposed on each SMF 52 in the WDM coupler 56, and the SMF 52 is then converted into the coupling MC-EDF 51 again by the FI 53. Optical power from the SM-LD 55 moves to a main signal while passing through the coupling MC-EDF 51, and thus the main signal is amplified and a gain of the main signal can be increased. In the MC-EDFA of the core-individual-pumping method in FIG. 4, a gain of the optical amplifier is controlled by measuring optical power of an input and an output by the input-light power monitor 57 and the output-light power monitor 58, and controlling optical power of the SM-LD 55 being a pumping light source by the controller 59, based on the measured optical power.

Patent Literature 1 (PTL1) relates to a multicore optical fiber amplifier, and proposes that a pumping light introduction optical fiber is disposed in a clad portion in which a multicore optical fiber is disposed, and pumping light is introduced into the pumping light introduction optical fiber. Patent Literature 2 (PTL2) relates to a multicore optical fiber amplifier, and proposes that, when pumping light is input to a core portion of a multicore optical fiber, an amplification medium added to the core portion is brought into a light pumping state and a state where optical amplification can be achieved, and thus signal light being input to the core portion propagates while being optically amplified in the core portion.

CITATION LIST

Patent Literature

[PTL1] International Publication No. WO2012/173271
[PTL2] Japanese Patent Application Laid-Open No. 2015-005667

SUMMARY OF INVENTION

Technical Problem

As a control method for an optical amplifier, there are constant gain control (automatic gain control: AGC), constant output control (automatic level control: ALC), constant pumping current control (automatic power control: APC), and the like. Each control is performed by measuring optical power of an input and an output by an optical power monitor, and controlling optical power of a pumping light source by a controller, based on the measured light power. The techniques are an amplification method for an optical fiber amplifier with a small influence of crosstalk between cores, and there is a problem that it is difficult to perform stable amplification in a coupling MC-EDFA having great crosstalk between cores.

FIG. 5 illustrates an operation of a coupling MC-EDFA on an assumption that a conventional control method is applied to the coupling MC-EDFA. For example, it is assumed that input light power of a main signal is all equal, and the same gain is acquired in an optical fiber amplifier. As in a lower left graph in FIG. 5, when input light power of a main signal is all equal for four channels (ch1, ch2, ch3, and ch4), a method of applying fixed pumping light power to each core of a multicore is used. When the same control is applied to a multicore optical fiber in which crosstalk occurs, such as a coupling MCF, pumping light becomes unequal while passing through a pumping medium, due to crosstalk for four channels (ch1, ch2, ch3, and ch4). As a result, there is a problem that the same gain cannot be acquired as in a lower right graph in FIG. 5.

Therefore, an object of the present invention is to provide an optical amplifier and a control method therefor that are able to stably control an optical amplifier using a multicore optical fiber.

Solution to Problem

In order to achieve the object described above, an optical amplifier according to the present invention is an optical amplifier using, as a gain medium, a multicore optical fiber including a plurality of cores, and includes:
an input-light power monitor that monitors optical power of input light to the plurality of cores of the multicore optical fiber;
an output-light power monitor that monitors optical power of output light, from the plurality of cores, that has passed through the multicore optical fiber and has passed through a medium;
a crosstalk monitor that monitors a crosstalk amount between cores among the plurality of cores; and
a controller that controls pumping light power of pumping light to be superimposed on input light to the plurality of cores, based on the monitored optical power of the input light, the monitored optical power of the output light, and the monitored crosstalk amount between the cores.

A control method for an optical amplifier according to the present invention is a control method for an optical amplifier using, as a gain medium, a multicore optical fiber including a plurality of cores, and includes:
monitoring optical power of input light to the plurality of cores of the multicore optical fiber;
monitoring optical power of output light, from the plurality of cores, that has passed through the multicore optical fiber and has passed through a medium;
monitoring a crosstalk amount between cores among the plurality of cores; and
controlling pumping light power of pumping light to be superimposed on input light to the plurality of cores, based on the monitored optical power of the input light, the monitored optical power of the output light, and the monitored crosstalk amount between the cores.

Advantageous Effects of Invention

The present invention is able to stably control an optical amplifier using a multicore optical fiber.

EXAMPLE EMBODIMENT

An outline of an example embodiment of the present invention will be described before a specific example embodiment of the present invention is described. In the present invention, in an operation of a coupling multicore erbium doped optical fiber amplifier (coupling MC-EDFA) as one example of a multicore optical fiber amplifier, optical power of each core and crosstalk are measured by using an optical power monitor for each core and a crosstalk monitor, and pumping light power injected to the core is controlled based on a measurement result. Crosstalk between cores being a target of the example embodiment of the present invention is determined by a structure of the optical fiber amplifier, an environment, and the like. Crosstalk from a certain core to another core is determined as a coefficient in a structural manner, and an absolute amount of the crosstalk is determined by multiplying the coefficient by an optical signal amount to be input.

As a first technique, input light power to each core, output light power that has passed through a gain medium, and a crosstalk amount acquired from residual pumping light power are measured, and pumping light power is controlled in such a way as to acquire a desired gain by using a relational expression of (gain)=(gain coefficient formed of self-gain and crosstalk gain)×(pumping light power).

As a second technique, a table acquired by two-dimensionally tabulating a relationship between pumping light power and a gain, based on a gain coefficient X calculated in the first technique, is referred to, and the pumping light power is controlled in such a way as to acquire a desired gain.

As a third technique, by using input light power to each core, output light power that has passed through a gain medium, and a crosstalk amount acquired from residual pumping light power, a condition that an influence of a crosstalk amount from each core to another core is equal is set, a surplus gain is then removed, and a desired gain is thus acquired.

As a fourth technique, communication setting in which an optical network is stable is performed by using the coupling MC-EDFA using the first to third techniques described above.

The optical amplifier according to the example embodiment of the present invention controls pumping light power injected to each core, from input light power to each core, output light power that has passed through a gain medium, and a crosstalk amount acquired from residual pumping light power. In this way, stable amplification can also be performed in a multicore optical fiber amplifier having great crosstalk between cores. In this way, control can be performed in such a way as to set the same gain between cores.

Furthermore, the optical communication network according to the example embodiment of the present invention using such an optical amplifier can perform stable communication setting.

First Example Embodiment

Figure 1:
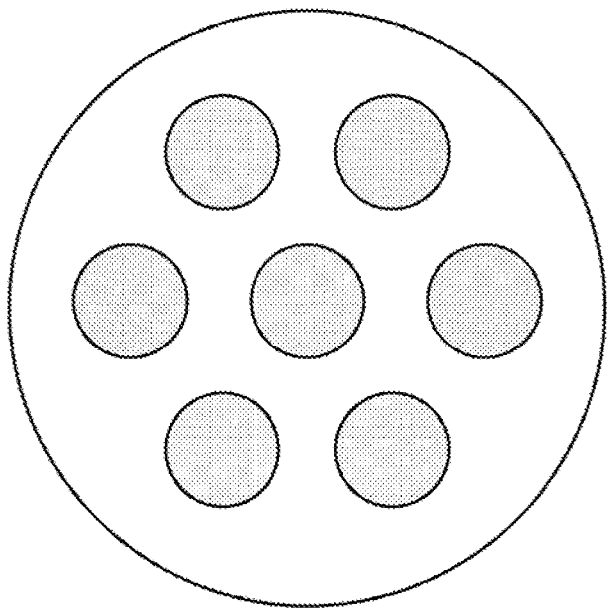
FIG. 1 is a structural diagram illustrating one example of a multicore optical fiber of seven cores.
Figure 2:
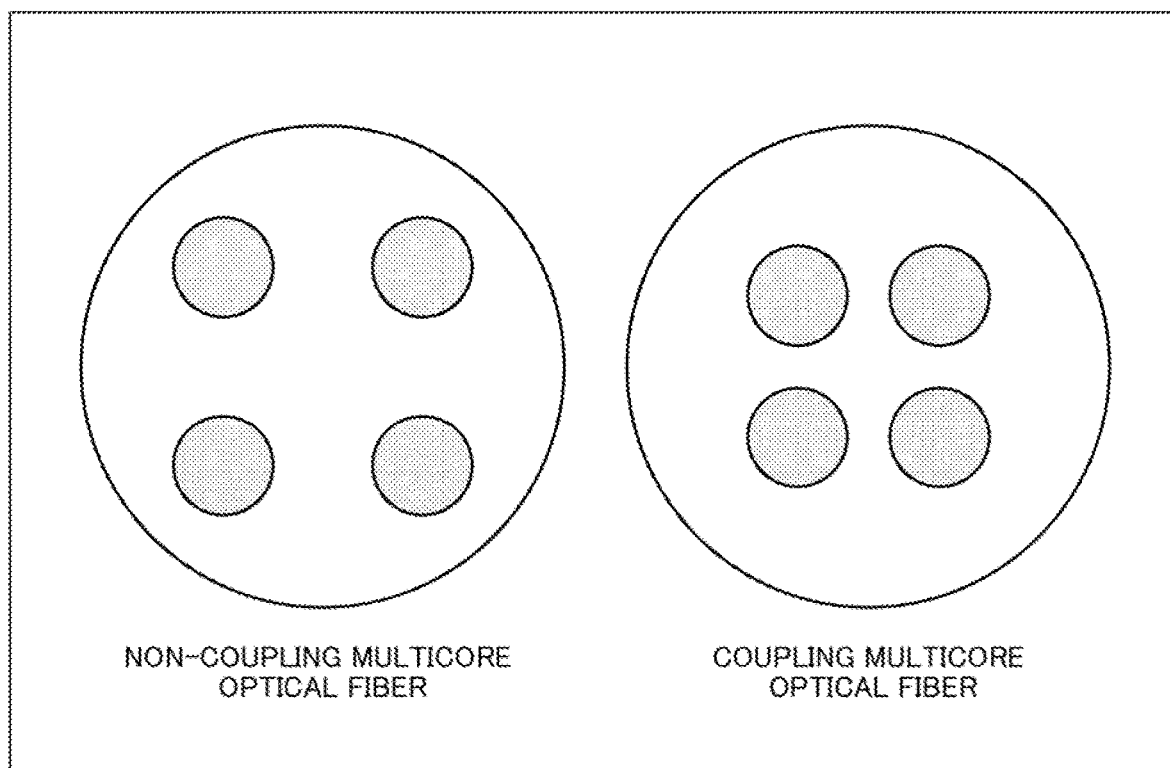
FIG. 2 is a structural diagram illustrating one example of non-coupling and coupling multicore optical fibers of four cores.
Figure 3:
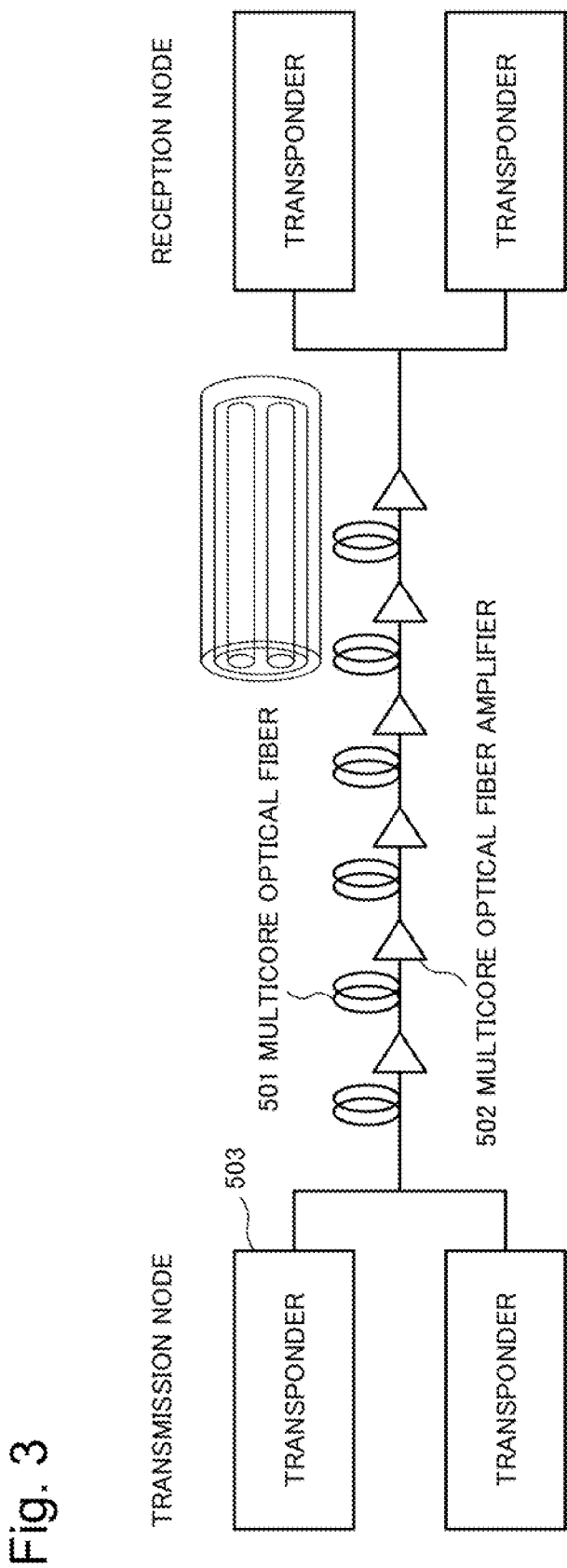
FIG. 3 is a configuration diagram illustrating one example of an optical network using a multicore optical fiber.
Figure 4:
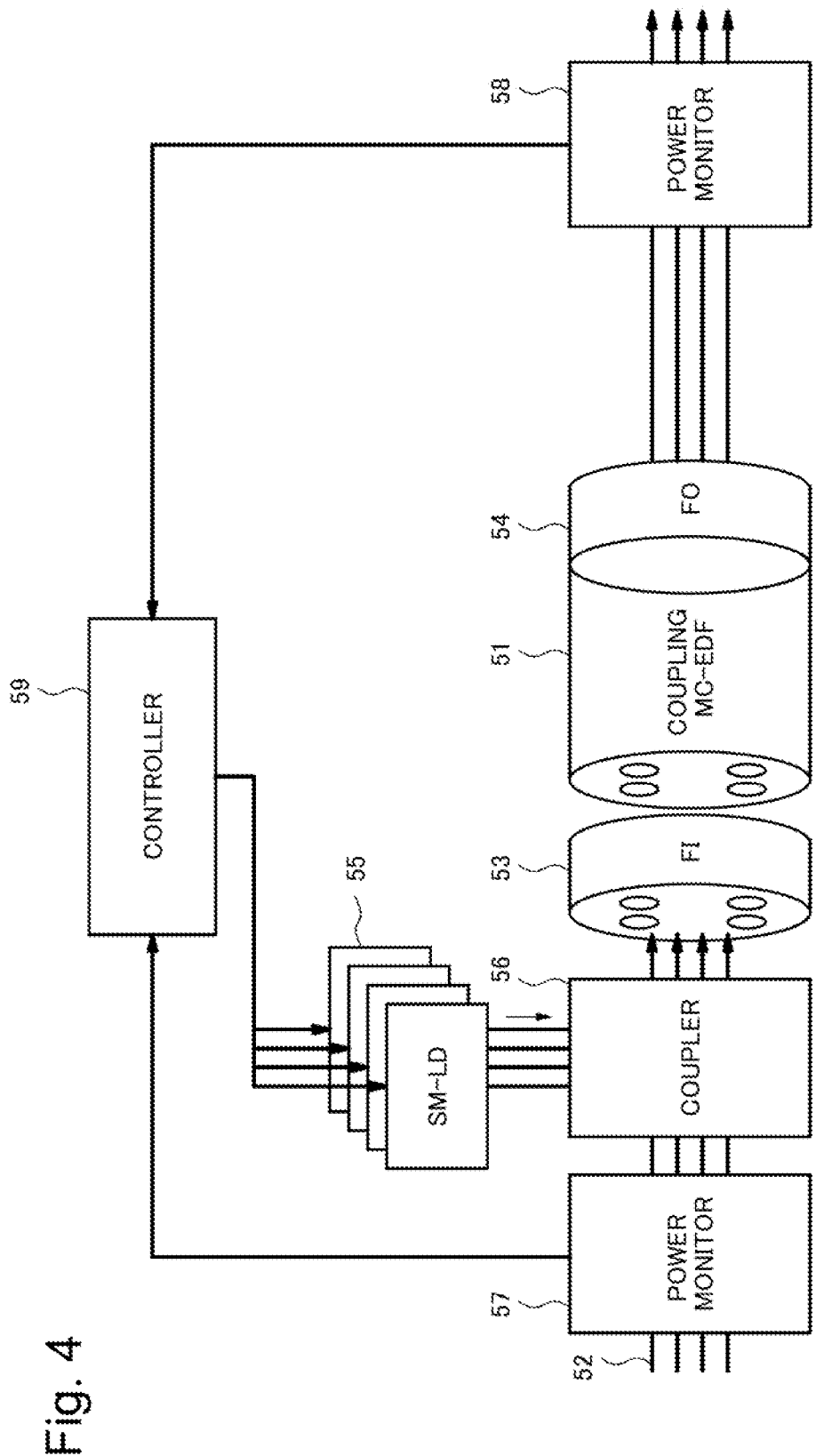
FIG. 4 is a block diagram for describing a multicore optical fiber amplifier of a core-individual-pumping method.
Figure 5:
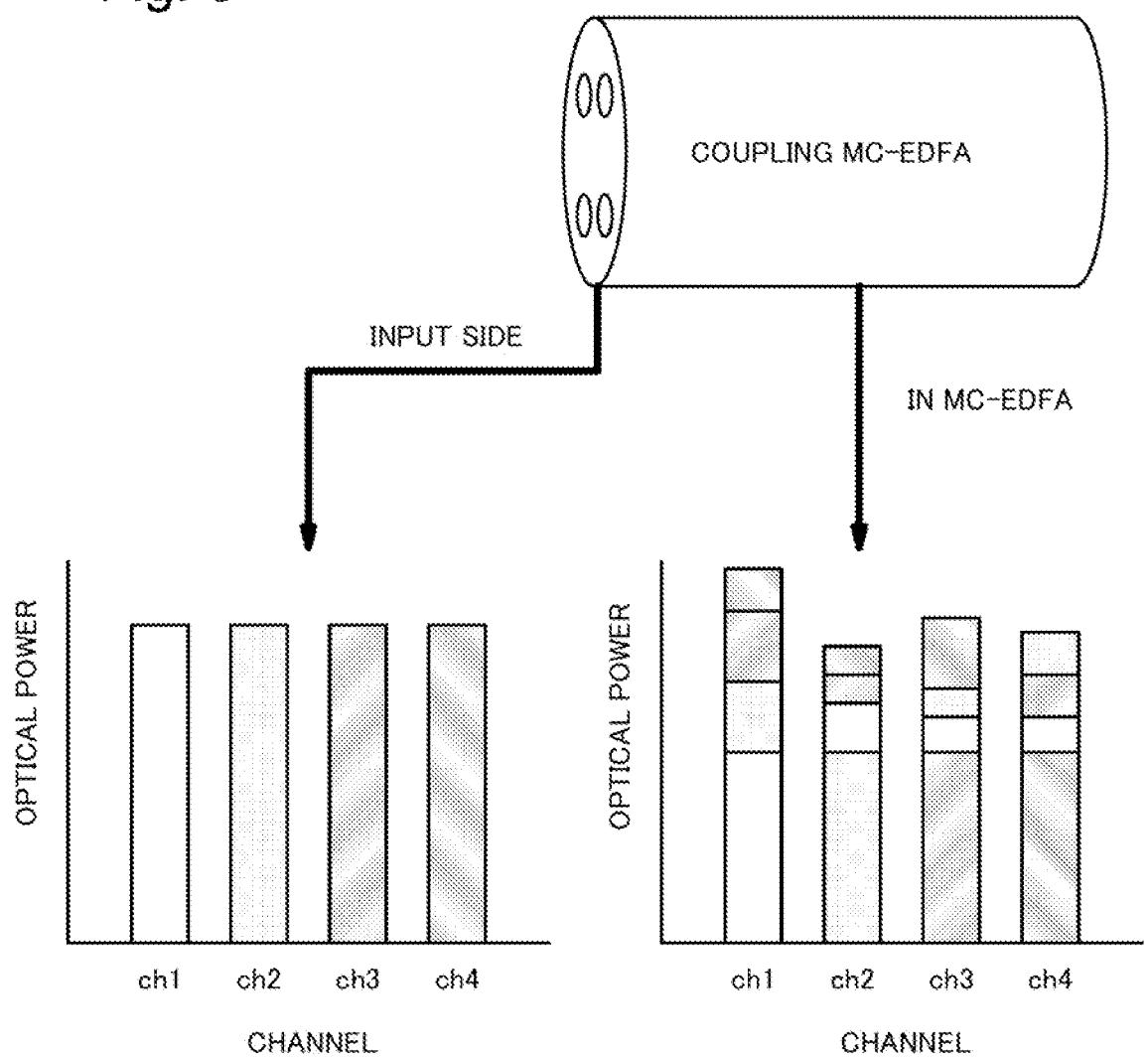
FIG. 5 is a block diagram for describing a case on an assumption that a conventional control method is applied to a coupling MC-EDFA.
Figure 6:
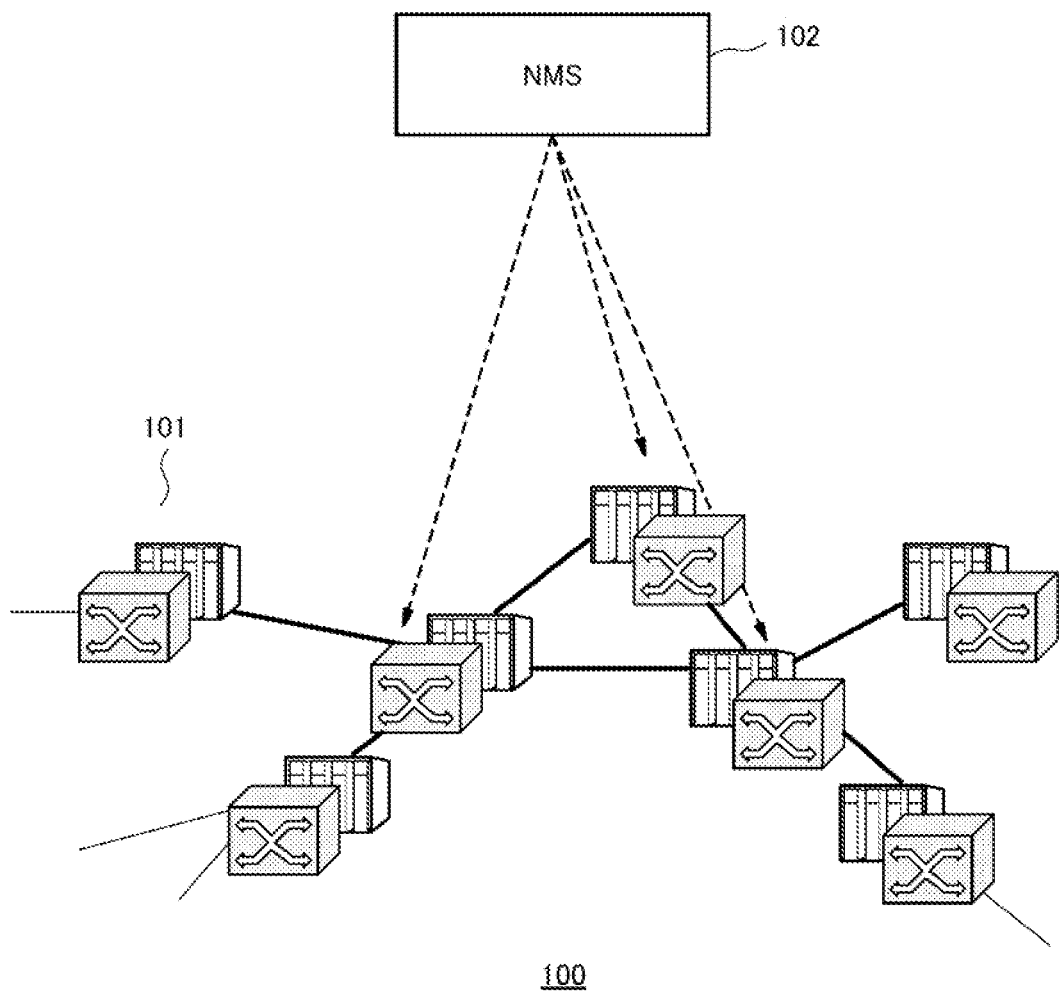
FIG. 6 is a configuration diagram of a network.

First, a first example embodiment of the present invention will be described. FIG. 6 is a configuration diagram illustrating one example of an optical communication network to which the present invention is applied. A network 100 in FIG. 6 is configured to include a node 101, and an NMS 102 as one example of a network management system for receiving a path setting request from a client (not illustrated), performing a path search, and giving an instruction such as switching to each node 101, based on a result of the path search.

Figure 7:
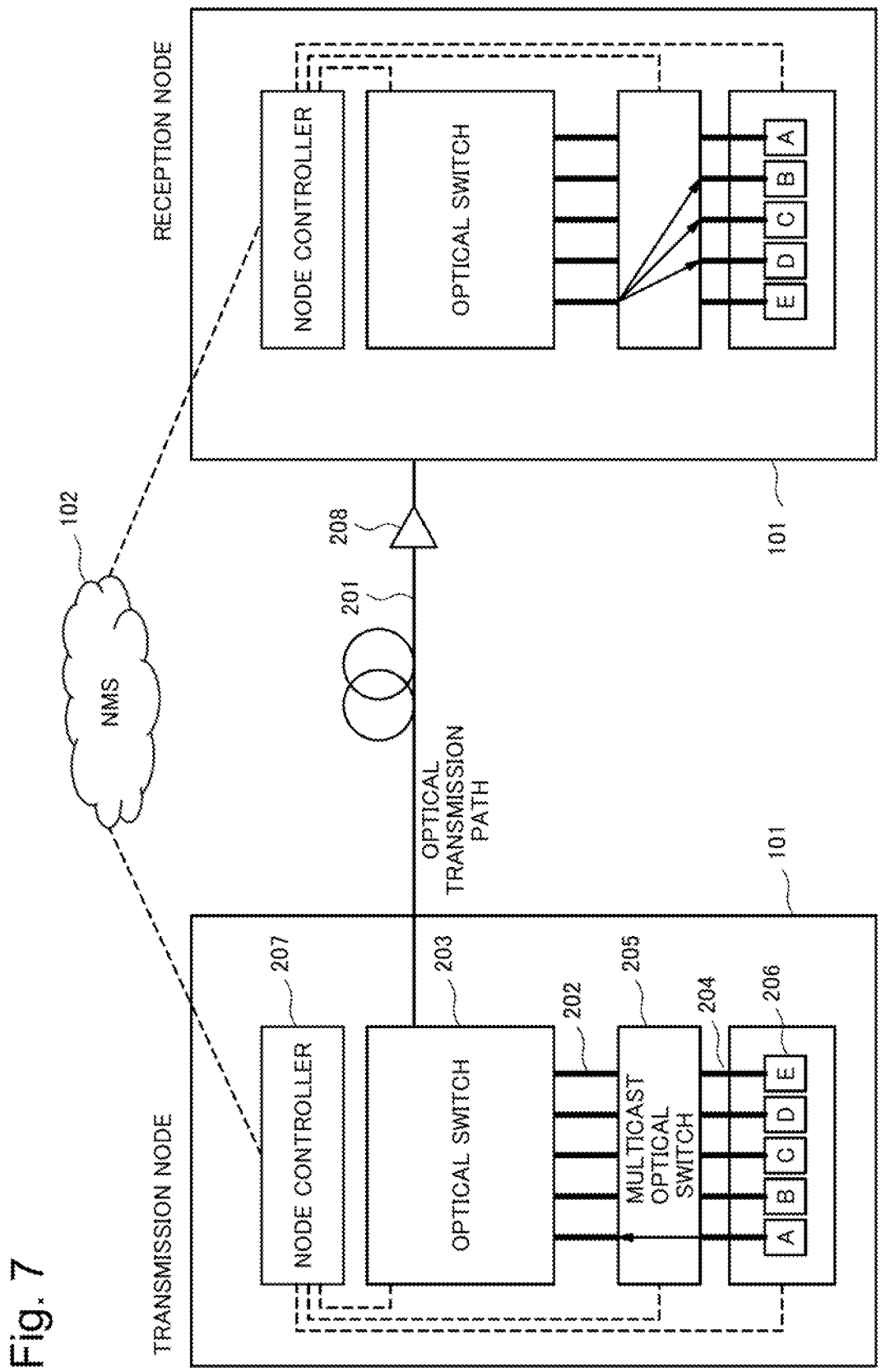
FIG. 7 is a configuration diagram of a node of the network in FIG. 6.

FIG. 7 is a configuration diagram more specifically describing each node and the like of the network 100 in FIG. 6. The node 101 includes an optical switch 203, a transponder-side port 204, a multicast optical switch 205, a transponder 206, and a node controller 207.

The optical switch 203 switches, by a wavelength unit, a path of a wavelength multiplexed optical signal which remains as light from an optical transmission path 201, transmits the wavelength multiplexed optical signal again to the optical transmission path 201, and also switches, to a division/insertion port 202 side by a wavelength unit, a wavelength multiplexed optical signal divided from the optical transmission path 201 by the node 101 and a wavelength multiplexed optical signal inserted into the optical transmission path 201 by the node 101.

The multicast optical switch 205 connects, by a wavelength unit, any division/insertion port 202 and any transponder-side port 204 to each other. The transponder 206 is connected to the transponder-side port 204, and receives or transmits an optical signal with any wavelength. The node controller 207 receives an instruction from the NMS 102, and controls an in-node device (the optical switch 203, the multicast optical switch 205, and the transponder 206).

The node 101 and the node 101 are connected to each other via the optical transmission path 201, and an optical amplifier 208 that compensates for a loss of the optical transmission path 201 is provided on the optical transmission path 201.

Herein, each component of the node 101 will be described in detail. The optical switch 203 is a switch that is able to achieve any wavelength insertion/division of a wavelength multiplexed optical signal to be transmitted, and a wavelength selectable switch (WSS) is currently widely used. The multicast optical switch 205 is an optical switch that connects any transponder 206 to any port of the optical switch 203. An optical switch having a so-called colorless, directionless and contentionless (CDC) function without a direction restriction, a wavelength restriction, and a wavelength conflict is currently used for the multicast optical switch 205.

Figure 8:
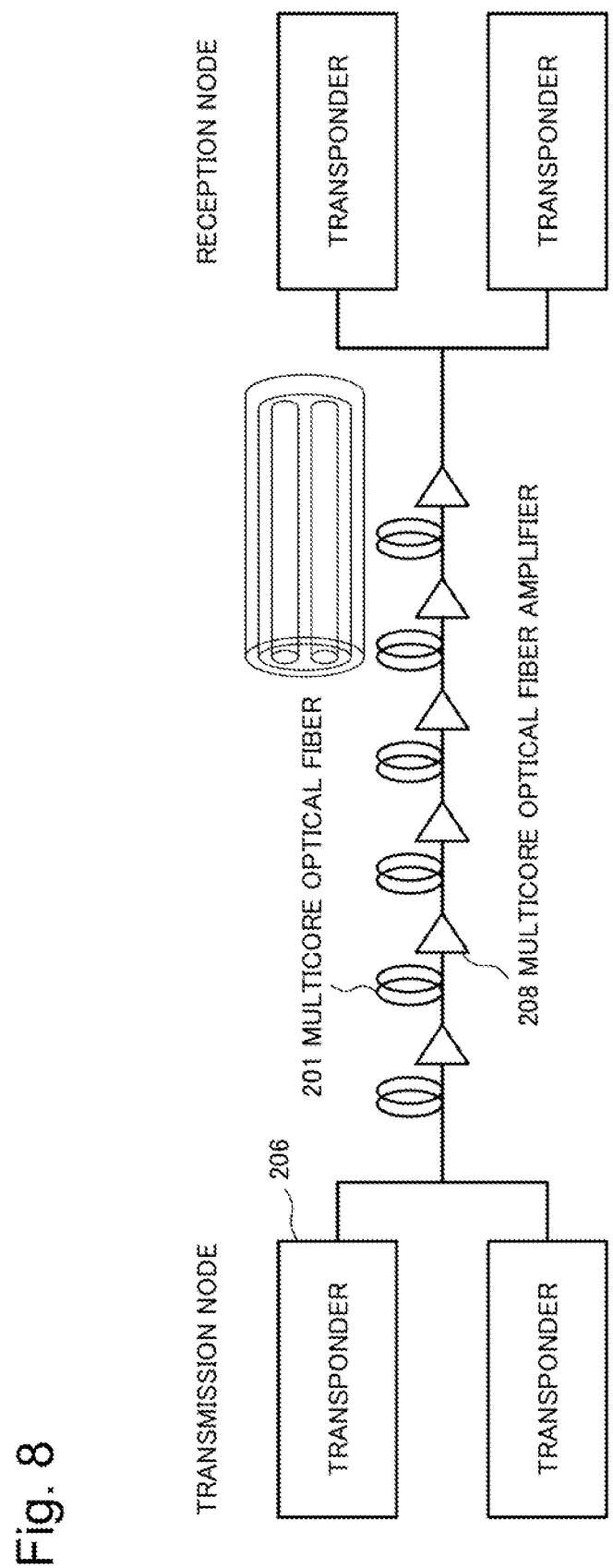
FIG. 8 is a configuration diagram of a network related to an example embodiment of the present invention.

FIG. 8 is a diagram in which a related part is extracted from the configuration of the network 100 in FIG. 6 for describing a configuration of the example embodiment according to the present invention. A network in FIG. 8 is configured to include the transponder 206 of the transmission node and the reception node, a coupling multicore optical fiber (coupling MCF) as one example of the optical transmission path 201 that transmits an optical signal from the transponder 206, and a coupling multicore optical fiber amplifier (coupling MC-EDFA) as one example of the optical amplifier 208 that is provided on the optical transmission path and compensates for a transmission loss of the optical transmission path. Note that, although not illustrated in FIG. 8, the optical switch 203 installed on the node 101 as the transmission node and the reception node illustrated in FIG. 7 performs multiplexing of a wavelength of each transponder in the transmission node and demultiplexing of a wavelength of each transponder in the reception node.

Figure 9:
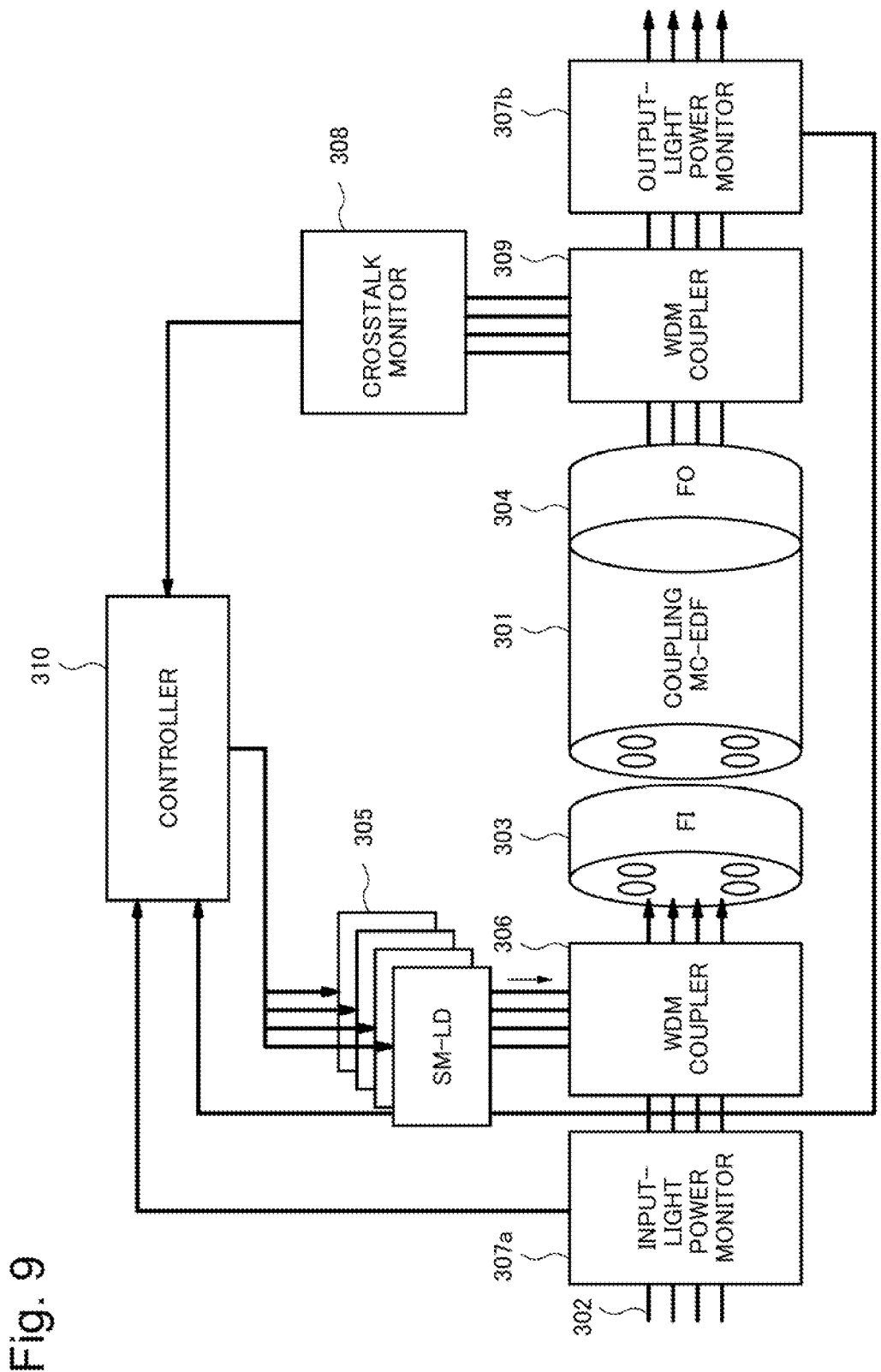
FIG. 9 is a configuration diagram of a coupling MC-EDFA according to a first example embodiment of the present invention.

Next, an optical amplifier according to the first example embodiment of the present invention will be described. FIG. 9 illustrates a multicore optical fiber amplifier as one example of the optical amplifier according to the first example embodiment of the present invention. FIG. 9 illustrates a coupling multicore optical fiber amplifier, particularly a coupling multicore erbium doped optical fiber amplifier (coupling MC-EDFA) in which an erbium (Er) ion as an amplification medium is added to each core. The coupling MC-EDFA in FIG. 9 has a structure enabling core individual pumping that individually pumps each core and amplifies an optical signal in the core.

The coupling MC-EDFA in FIG. 9 includes a coupling multicore erbium doped optical fiber (coupling MC-EDF) 301 being a gain medium, and a conversion medium (fan in: FI 303, fan out: FO 304) that connects an SMF 302 as one example of a single mode optical fiber and the coupling MC-EDF 301 to each other. Furthermore, the coupling MC-EDFA in FIG. 9 includes a single mode pumping light source (single mode laser diode: SM-LD) 305 with a wavelength of 980 nm or 1480 nm, a WDM coupler 306 as one example of a wavelength division multiplexing coupler for coupling the SM-LD 305 to the coupling MC-EDF 301, an input-light power monitor 307a as one example of an optical power monitor disposed on an input side, and an output-light power monitor 307b as one example of an optical power monitor disposed on an output side. Furthermore, the coupling MC-EDFA in FIG. 9 includes a crosstalk monitor 308 disposed on an output side of the coupling MC-EDF 301, and a WDM coupler 309 that divides a part of an output from the FO 304 into the crosstalk monitor 308. Furthermore, the coupling MC-EDFA in FIG. 9 includes a controller 310 that controls pumping light power of the SM-LD 305, based on measurement information of the crosstalk monitor 308.

Operation in First Example Embodiment

Figure 10:
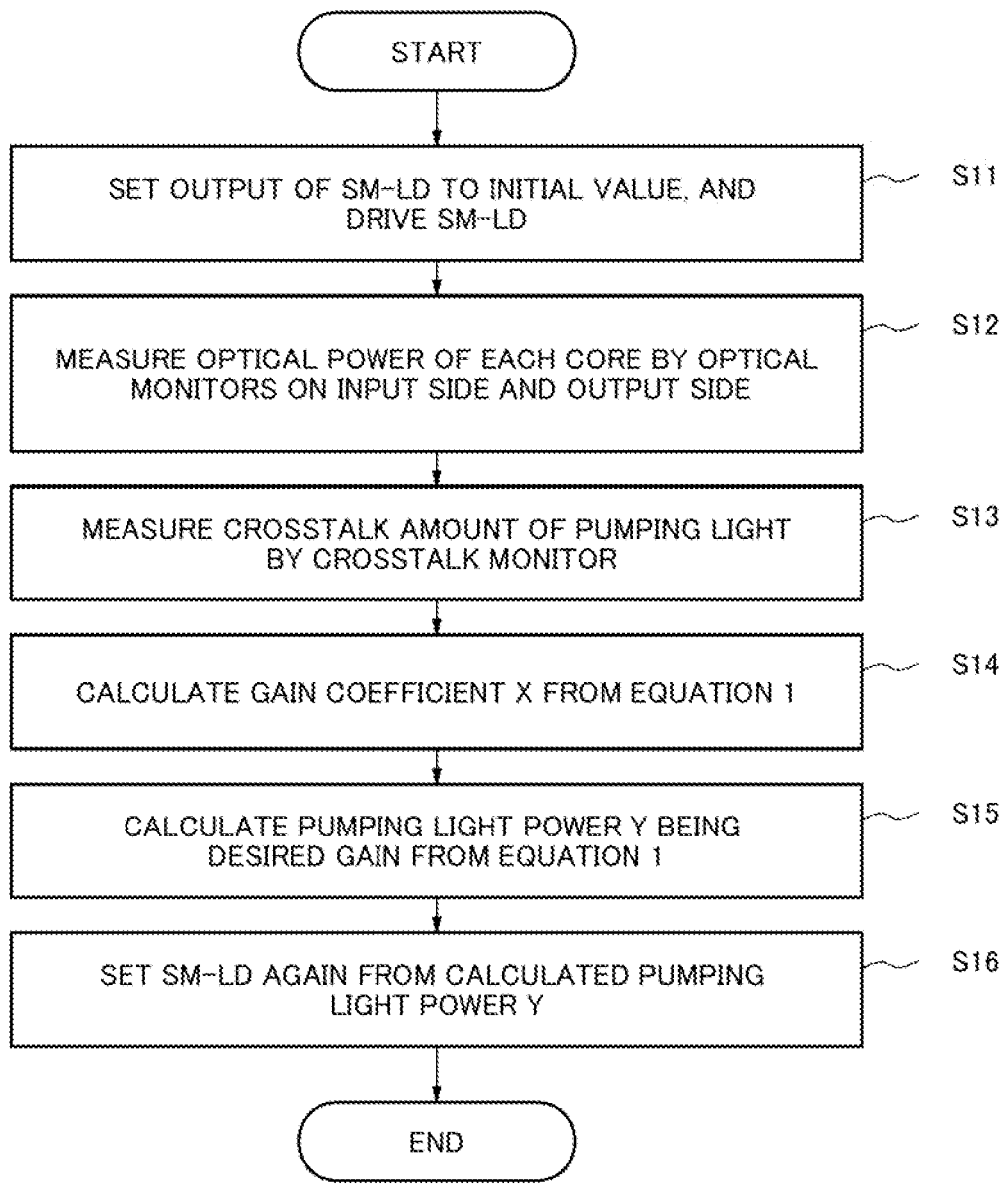
FIG. 10 is a flowchart for describing an operation in the first example embodiment.

Next, an operation of the optical amplifier according to the present example embodiment will be described by using FIGS. 8, 9, and 10. FIG. 10 is a flowchart illustrating an operation for setting a gain of the optical amplifier in FIG. 9.

First, an amplification operation by the optical amplifier in FIG. 9 will be described. An optical transmission path (not illustrated) of the coupling MCF is temporarily converted into the SMF 302, pumping light from the SM-LD 305 is superimposed on a main signal of each SMF in the WDM coupler 306, and the main signal is then converted into the coupling MC-EDF 301 again by the FI 303. Optical power from the SM-LD 305 moves to the main signal while passing through the coupling MC-EDF 301, and thus the main signal is amplified and a gain of the main signal can be acquired.

Next, an AGC operation by the optical amplifier in FIG. 9 will be described as one example. FIG. 10 is a flowchart of the AGC operation. First, an output of the SM-LD 305 is set to a predetermined initial value, and the SM-LD 305 is driven (S11). Next, the input-light power monitor 307a measures input light power to each core, and the output-light power monitor 307b measures output light power that has passed through a medium (S12). Next, residual pumping light is separated from a main signal in the WDM coupler 309 on the output side, and the crosstalk monitor 308 measures a crosstalk amount of pumping light from optical power of the residual pumping light separated in such a manner (S13).

As a method of a crosstalk monitor, for example, a method of shifting a wavelength of the SM-LD 305 input to each core and distinguishing which core crosstalk is from is conceivable. In other words, it is conceivable that the crosstalk monitor 308 recognizes a wavelength difference between pumping light sources with different wavelengths in each core, and measures crosstalk. Further, as another method of a crosstalk monitor, for example, a method of superimposing a signal at a low frequency different for each core on pumping light from the SM-LD 305 input to each core and distinguishing which core crosstalk is from, and the like are conceivable. In other words, it is conceivable that the crosstalk monitor 308 recognizes a frequency difference between pumping light sources having pumping light on which signals at different frequencies are superimposed, and measures crosstalk. To give further details, in a case of "n cores", it is conceivable that wavelengths of the SM-LD 305 input to the n cores are shifted from each other, and which core of the n cores crosstalk is from is distinguished. Further, as another method of a crosstalk monitor, it is conceivable that n kinds of signals at frequencies (low frequencies) different from each other are superimposed on pumping light from the SM-LD 305 input to each of the n cores, and which core of the n cores crosstalk is from is distinguished. Then, an existing means can be used for such means for identifying a wavelength and means for identifying a frequency.

Note that pumping light power from the SM-LD 305 and a gain (gain of the optical amplifier) acquired by the pumping light power can be represented in the following Equation 1.

$$\begin{bmatrix} P_{o1}/P_{i1} \\ P_{o2}/P_{i2} \\ P_{o3}/P_{i3} \\ \vdots \\ P_{on}/P_{in} \end{bmatrix} = \begin{bmatrix} X_{11} & X_{12} & \ldots & X_{1n} \\ X_{21} & X_{22} & \ldots & X_{2n} \\ X_{31} & X_{32} & \ldots & X_{3n} \\ \vdots & \vdots & \ddots & \vdots \\ X_{n1} & X_{n2} & \ldots & X_{nn} \end{bmatrix} \begin{bmatrix} Y_{i1} \\ Y_{i2} \\ Y_{i3} \\ \vdots \\ Y_{in} \end{bmatrix} \quad \text{[Equation 1]}$$

Herein, $P_{on}$ is output light power in a case of n cores, $P_{in}$ is input light power in the case of n cores, and $Y_{in}$ is pumping light power from the SM-LD 305. In other words, a gain ($P_{on}/P_{in}$) of the optical amplifier is determined by multiplying pumping light power Y from the SM-LD 305 by a certain gain coefficient X. Note that a diagonal term of the gain coefficient X is a self-gain acquired from pumping light input to a self-core, and a term other than a diagonal term is a crosstalk gain acquired from pumping light input to another core. For example, in a case of four inputs and four outputs, the gain coefficient X is formed of 16 components of $X_{11}$ to $X_{14}$, $X_{21}$ to $X_{24}$, $X_{31}$ to $X_{34}$, and $X_{41}$ to $X_{44}$. In order to determine the 16 components, all of the 16 components can be determined by setting each of output light power, input light power, and pumping light power under four different conditions and increasing the number of simultaneous equations to 16.

Since the output light power $P_{on}$, the input light power $P_{in}$, and the pumping light power $Y_{in}$ can be already measured, the gain coefficient X is calculated and determined by calculating a diagonal term component of the gain coefficient X by using Equation 1 (S14). Next, the pumping light power $Y_{in}$ from which a desired gain ($P_{on}/P_{in}$) is acquired is obtained again from Equation 1 (S15). Next, the SM-LD 305 is set again from the calculated pumping light power $Y_{in}$ (S16). In other words, an operation of the SM-LD 305 associated with each core is an operation of increasing a set value of the SM-LD 305 for correcting a crosstalk amount when the crosstalk amount is great and a movement of a signal to another core is great. Conversely, the operation of the SM-LD 305 associated with each core is an operation of reducing a set value of the SM-LD 305 for correcting a crosstalk amount when the crosstalk amount is small and a movement of a signal to another core is small. Further, even when a crosstalk amount dynamically changes, the operation described above is performed in such a way as to correct the crosstalk amount, and thus a stable gain can be always acquired. In this way, the operation of setting a gain of the optical amplifier is completed.

Advantageous Effect of First Example Embodiment

The optical amplifier according to the present example embodiment controls pumping light power injected to each core, from input light power to each core, output light power that has passed through a gain medium, and a crosstalk amount acquired from residual pumping light power. In this way, stable amplification can also be performed in a multicore optical fiber amplifier having great crosstalk between cores. In this way, control can be performed in such a way as to set the same gain between cores.

In other words, the input-light power monitor 307a measures input light power to each core of the SMF 302, the output-light power monitor 307b measures output light power that has passed through the coupling MC-EDF 301 and has passed through a medium, and the crosstalk monitor 308 measures a crosstalk amount of pumping light from optical power of residual pumping light separated from a main signal in the WDM coupler 309 on the output side. The pumping light power Y from the SM-LD 305 being injected to each core is controlled from the input light power, the output light power that has passed through the gain medium, and the crosstalk amount acquired from the residual pumping light power, which are measured in such a manner. In this way, stable amplification can also be performed in a multicore optical fiber amplifier having great crosstalk between cores like the coupling MC-EDF 301. In this way, control can be performed in such a way as to set the same gain between cores.

Second Example Embodiment

Figure 11:
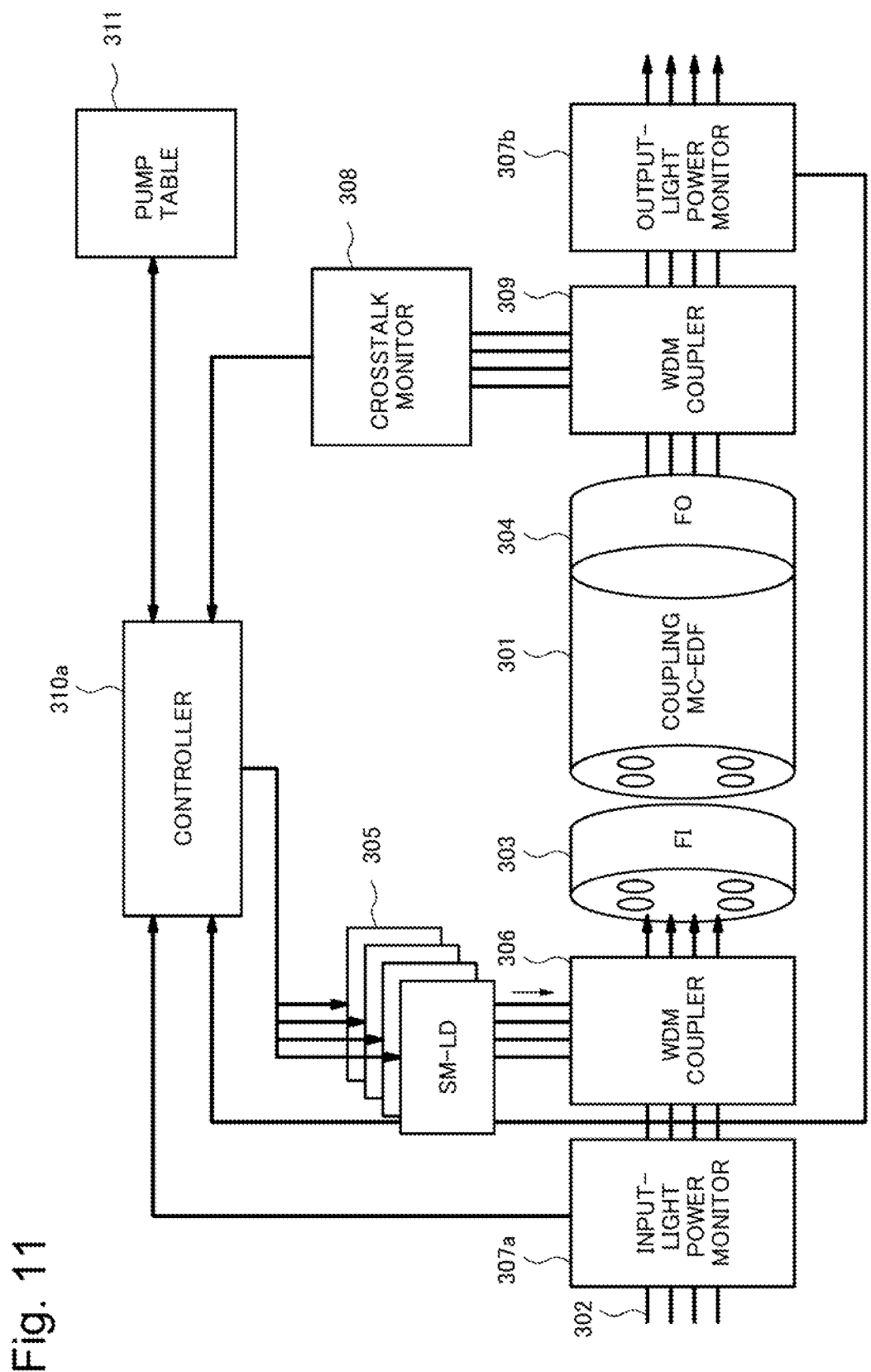
FIG. 11 is a configuration diagram of a coupling MC-EDFA according to a second example embodiment.

Next, an optical amplifier according to a second example embodiment of the present invention will be described. FIG. 11 illustrates a multicore optical fiber amplifier as one example of an optical amplifier according to the second example embodiment of the present invention. Similarly to the first example embodiment, FIG. 11 illustrates a coupling multicore optical fiber amplifier, particularly a coupling multicore erbium doped optical fiber amplifier (coupling MC-EDFA). Similarly to the first example embodiment described above, the coupling MC-EDFA in FIG. 11 has a structure in which core individual pumping that individually pumps each core and amplifies an optical signal in the core can be achieved. An element similar to that in the first example embodiment is provided with the same reference sign, and detailed description thereof will be omitted.

Configuration of Second Example Embodiment

Similarly to the first example embodiment, the coupling MC-EDFA in FIG. 11 includes a coupling MC-EDF 301 being a gain medium, and a conversion medium (FI 303 and FO 304) that connects an SMF 302 as one example of a single mode optical fiber and the coupling MC-EDF 301 to each other. Furthermore, similarly to the first example embodiment, the coupling MC-EDFA in FIG. 11 includes an SM-LD 305 being a single mode pumping light source with a wavelength of 980 nm or 1480 nm, and a WDM coupler 306 as one example of a wavelength division multiplexing coupler for coupling the SM-LD 305 to the coupling MC-EDF 301. Furthermore, similarly to the first example embodiment, the coupling MC-EDFA in FIG. 11 includes an input-light power monitor 307a disposed on an input side, an output-light power monitor 307b disposed on an output side, a crosstalk monitor 308 disposed on an output side of the coupling MC-EDF 301, and a WDM coupler 309 that divides a part of an output from the FO 304 into the crosstalk monitor 308.

A pump table as one example of a table for determining an output of the SM-LD 305 from input light power of a main signal is added to the coupling MC-EDFA in FIG. 11. A pump table 311 is acquired by two-dimensionally tabulating a relationship between pumping light power $Y_{in}$ and a gain ($P_{out}/P_{in}$), based on a gain coefficient X calculated in the first example embodiment described above. The pumping light power $Y_{in}$ from which a desired gain ($P_{out}/P_{in}$) is acquired can be easily determined by referring to the pump table 311. It is conceivable that crosstalk between cores being a target of the example embodiment of the present invention does not greatly change once a transmission path is installed. Thus, by forming a table from one measurement at a time of initial introduction, an absolute crosstalk amount can be quickly calculated when the number of wavelengths is changed during operation.

Furthermore, the coupling MC-EDFA in FIG. 11 includes a controller 310a that controls pumping light power of the SM-LD 305, based on measurement information of the crosstalk monitor 308, and by referring to the pump table 311.

Operation in Second Example Embodiment

Next, an operation of the optical amplifier according to the present example embodiment will be described by using FIG. 11. First, an amplification operation by the optical amplifier in FIG. 11 will be described. Similarly to the first example embodiment, an optical transmission path (not illustrated) of the coupling MCF is temporarily converted into the SMF 302, pumping light from the SM-LD 305 is superimposed on a main signal of each SMF in the WDM coupler 306, and the main signal is then converted into the coupling MC-EDF 301 again by the FI 303. Light power from the SM-LD 305 moves to the main signal while passing through the coupling MC-EDF 301, and thus the main signal is amplified and a gain of the main signal can be acquired.

Next, an AGC operation by the optical amplifier in FIG. 11 will be described as one example. The pump table 311 holds a relationship between the pumping light power $Y_{in}$ and the gain ($P_{out}/P_{in}$), based on the gain coefficient X calculated in the first example embodiment described above. Thus, the controller 310a obtains, by referring to the pump table 311, pumping light power from which a desired gain is acquired, sets the SM-LD 305 again from the calculated pumping light power, and completes an operation of setting a gain of the optical amplifier.

Advantageous Effect of Second Example Embodiment

Similarly to the first example embodiment, the optical amplifier according to the present example embodiment controls pumping light power injected to each core, from input light power to each core, output light power that has passed through a gain medium, and a crosstalk amount acquired from residual pumping light power. In this way, stable amplification can also be performed in a multicore optical fiber amplifier having great crosstalk between cores. In this way, control can be performed in such a way as to set the same gain between cores.

Furthermore, according to the present example embodiment, the pumping light power $Y_{in}$ from which a desired gain ($P_{out}/P_{in}$) of the optical amplifier is acquired can be easily determined by referring to the pump table 311 acquired by two-dimensionally tabulating a relationship between the pumping light power $Y_{in}$ and the gain ($P_{out}/P_{in}$), based on the gain coefficient X.

Third Example Embodiment

Figure 12:
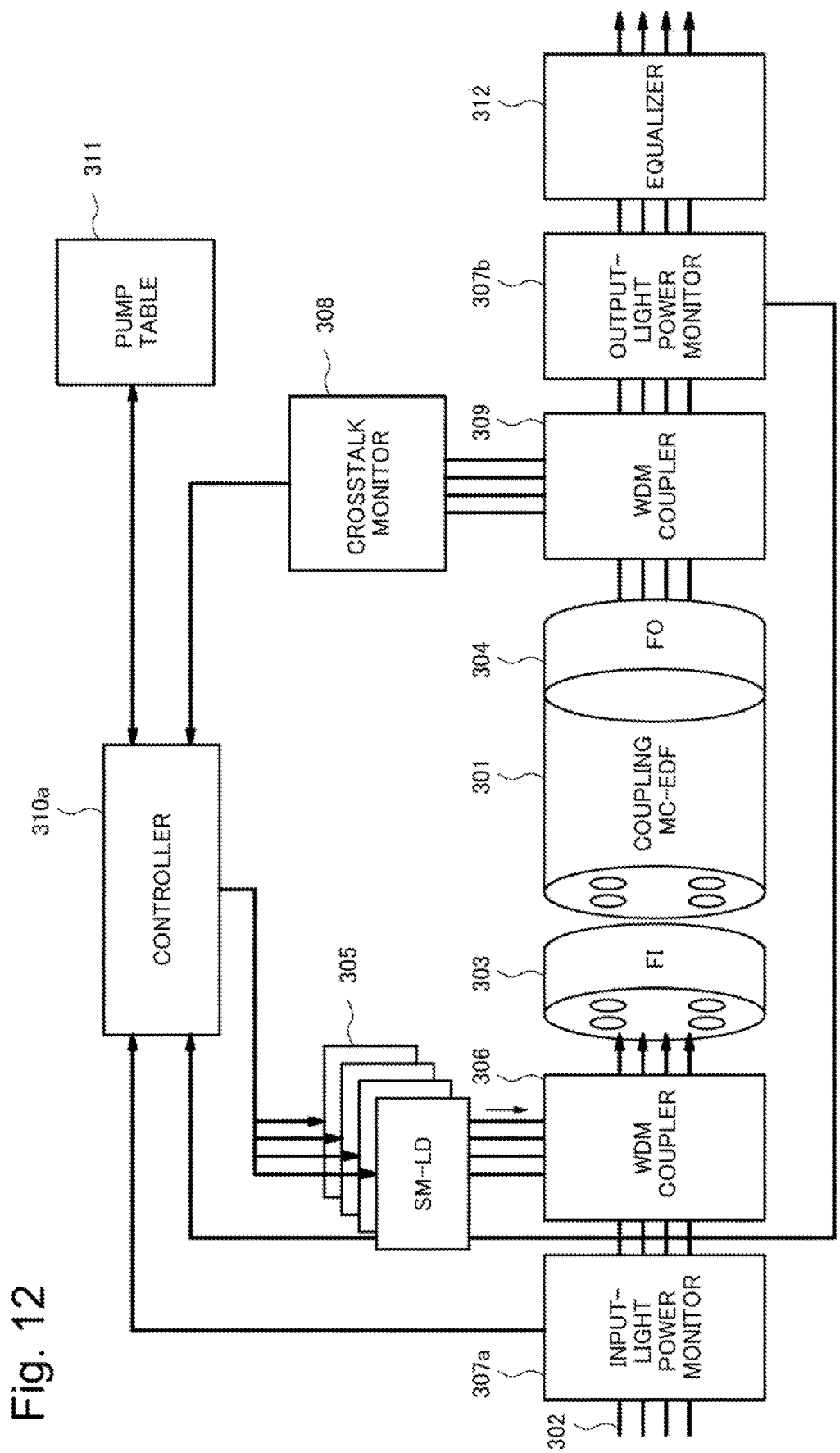
FIG. 12 is a configuration diagram of a coupling MC-EDFA according to a third example embodiment.

Next, an optical amplifier according to a third example embodiment of the present invention will be described. FIG. 12 illustrates a multicore optical fiber amplifier as one example of an optical amplifier according to the third example embodiment of the present invention. FIG. 12 illustrates a coupling multicore optical fiber amplifier, particularly a coupling multicore erbium doped optical fiber amplifier (coupling MC-EDFA). Similarly to the first and second example embodiments described above, the coupling MC-EDFA in FIG. 12 has a structure in which core individual pumping that individually pumps each core and amplifies an optical signal in the core can be achieved. An element similar to that in the first and second example embodiments is provided with the same reference sign, and detailed description thereof will be omitted. Note that the present example embodiment proposes a setting method simpler than that in the first and second example embodiments.

Configuration of Third Example Embodiment

Similarly to the first and second example embodiments, the coupling MC-EDFA in FIG. 12 includes a coupling MC-EDF 301 being a gain medium, and a conversion medium (FI 303 and FO 304) that connects an SMF 302 as one example of a single mode optical fiber and the coupling MC-EDF 301 to each other. Furthermore, similarly to the first and second example embodiments, the coupling MC-EDFA in FIG. 12 includes an SM-LD 305 being a single mode pumping light source with a wavelength of 980 nm or 1480 nm, and a WDM coupler 306 as one example of a wavelength division multiplexing coupler for coupling the SM-LD 305 to the coupling MC-EDF 301. Furthermore, similarly to the first and second example embodiments, the coupling MC-EDFA in FIG. 12 includes an input-light power monitor 307a disposed on an input side, and an output-light power monitor 307b disposed on an output side. Furthermore, similarly to the first and second example embodiments, the coupling MC-EDFA in FIG. 12 includes a crosstalk monitor 308 disposed on an output side of the coupling MC-EDF 301, and a WDM coupler 309 that divides a part of an output from the FO 304 into the crosstalk monitor 308.

Furthermore, similarly to the second example embodiment, a pump table as one example of a table for determining an output of the SM-LD 305 from input light power of a main signal is added to the coupling MC-EDFA in FIG. 12. A pump table 311 is acquired by two-dimensionally tabulating a relationship between pumping light power $Y_{in}$ and a gain ($P_{on}/P_{in}$), based on a gain coefficient X calculated in the first example embodiment described above. The pumping light power $Y_{in}$ from which a desired gain ($P_{on}/P_{in}$) is acquired can be easily determined by referring to the pump table 311.

Furthermore, similarly to the second example embodiment, the coupling MC-EDFA in FIG. 12 includes a controller 310a that controls pumping light power of the SM-LD 305, based on measurement information of the crosstalk monitor 308, by referring to the pump table 311.

Furthermore, as illustrated in FIG. 12, an equalizer 312 that cuts a surplus gain from output light power of a main signal is added to the coupling MC-EDFA according to the present example embodiment.

Operation in Third Example Embodiment

Figure 13:
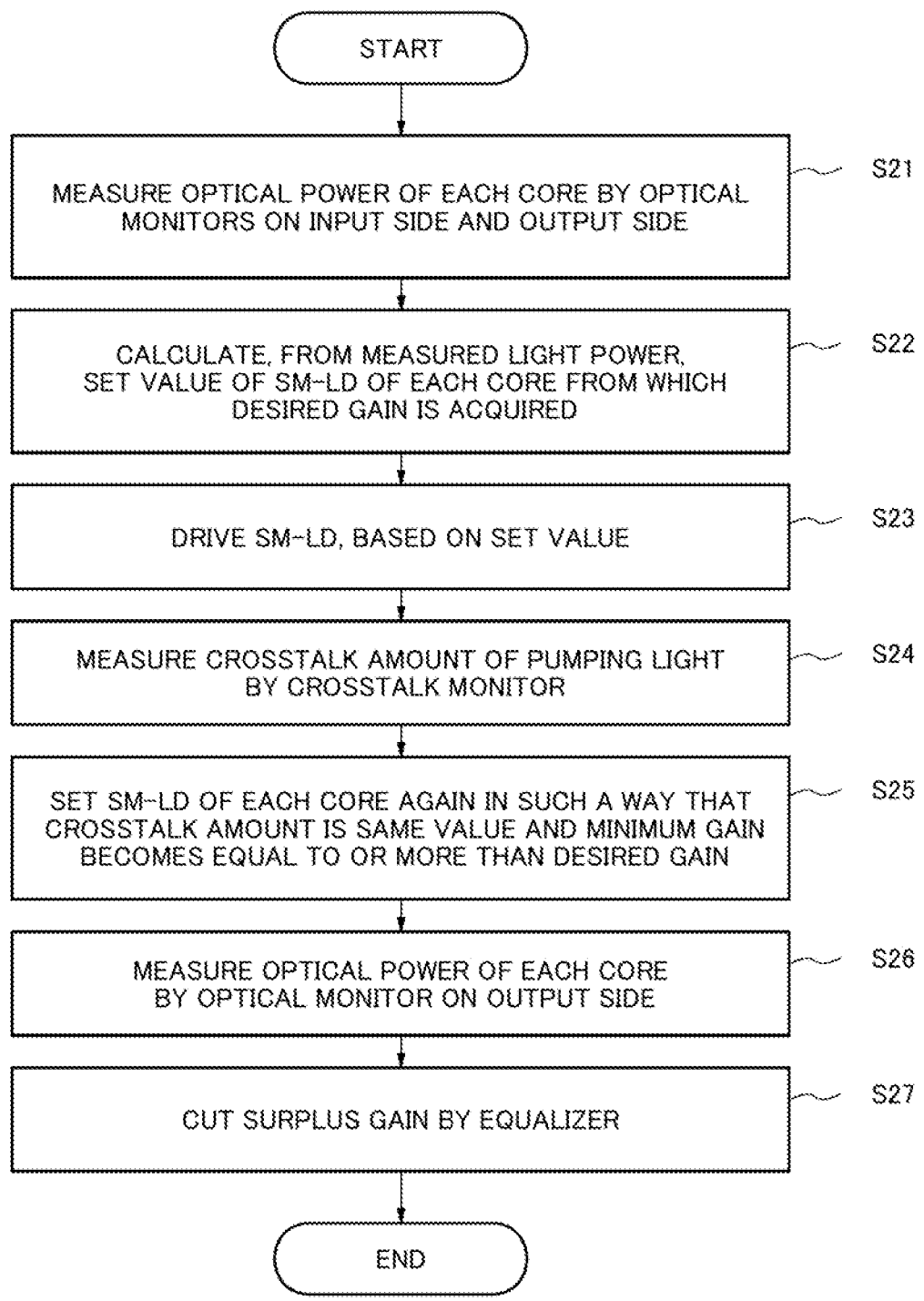
FIG. 13 is a flowchart illustrating an operation in the third example embodiment.

Next, an operation of the optical amplifier according to the present example embodiment will be described by using FIGS. 12 and 13. FIG. 13 is a flowchart illustrating an operation for setting a gain of the optical amplifier in FIG. 12.

First, an amplification operation by the optical amplifier in FIG. 12 will be described. Similarly to the first and second example embodiments, an optical transmission path (not illustrated) of the coupling MCF is temporarily converted into the SMF 302, pumping light from the SM-LD 305 is superimposed on a main signal of each SMF in the WDM coupler 306, and the main signal is then converted into the coupling MC-EDF 301 again by the FI 303. Optical power from the SM-LD 305 moves to the main signal while passing through the coupling MC-EDF 301, and thus the main signal is amplified and a gain of the main signal can be acquired.

Next, an AGC operation by the optical amplifier in FIG. 12 will be described as one example. An output of the SM-LD 305 is set to a predetermined initial value, and the SM-LD 305 is driven. Next, the input-light power monitor 307a measures input light power to each core, and the output-light power monitor 307b measures output light power that has passed through a medium (S21). Next, a set value of the SM-LD 305 of each core from which a desired gain is acquired is calculated from the measured light power (S22). Next, the SM-LD 305 is driven based on the referred set value (S23). Next, the crosstalk monitor 308 measures a crosstalk amount of pumping light from residual pumping light power separated from a main signal in the WDM coupler 309 on an output side (S24). Next, the SM-LD 305 of each core is set again in such a way that the minimum gain of each core becomes equal to or more than a desired gain and also that the crosstalk amount from each core to another core is the same value (S25). As described above, crosstalk between cores being a target of the example embodiment of the present invention is determined by a structure of the optical fiber amplifier, an environment, and the like. A measurement is performed once at a time of introduction, and a relationship between the gain coefficient X and pumping light power from the SM-LD 305 and the like can be determined based on Equation 1 described above. The crosstalk amount from each core to another core can be set the same, based on the relationship. Next, the output-light power monitor 307b measures output signal light power of each core again (S26). Next, the equalizer 312 cuts a surplus gain of each core (S27). Note that the surplus gain indicates a portion of a gain of a core that exceeds the desired gain (desired value) described above.

Advantageous Effect of Third Example Embodiment

Similarly to the first and second example embodiments, the optical amplifier according to the present example embodiment controls pumping light power injected to each core, from input light power to each core, output light power that has passed through a gain medium, and a crosstalk amount acquired from residual pumping light power. In this way, stable amplification can also be performed in a multi-core optical fiber amplifier having great crosstalk between cores. In this way, control can be performed in such a way as to set the same gain between cores.

Furthermore, according to the present example embodiment, the pumping light power $Y_{in}$ from which a desired gain ($P_{on}/P_{in}$) is acquired can be easily determined by referring to the pump table 311 acquired by two-dimensionally tabulating a relationship between the pumping light power $Y_{in}$ and the gain ($P_{on}/P_{in}$), based on the gain coefficient X.

Furthermore, the present example embodiment further includes the equalizer 312, and is able to thus cut a surplus gain from output light power of a main signal and can set a gain characteristic of each core of the optical amplifier closer to a desired gain characteristic. In this way, the pumping light power is set in such a way that the minimum gain of each core becomes equal to or more than a desired gain and also that a crosstalk amount from each core to another core is the same value, and a core having a gain that exceeds a desired value is cut by the equalizer 312, and thus a desired gain can be acquired from all cores. As compared to the first and second example embodiments in which the gain coefficient X the component of which is a variable is obtained, a combination of output light power $P_{ol}$ and pumping light power $Y_{in}$ with respect to input light power $P_{il}$ is then calculated, and a set value is strictly obtained, the present example embodiment can easily perform setting.

Fourth Example Embodiment

Figure 14:
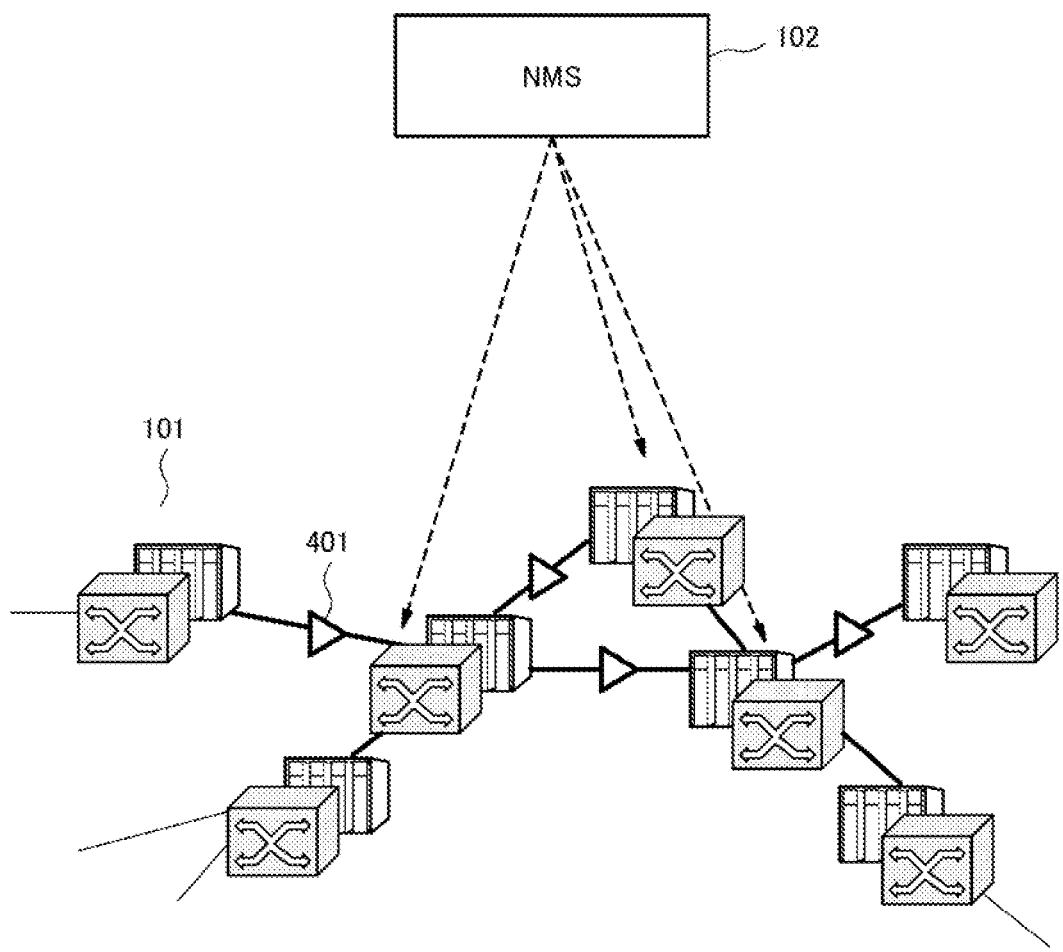
FIG. 14 is a configuration diagram of an optical communication network according to a fourth example embodiment.

Next, an optical communication network according to a fourth example embodiment of the present invention will be described in detail with reference to FIG. 14. FIG. 14 is a configuration diagram of the optical communication network according to the fourth example embodiment.

The optical communication network according to the present example embodiment is configured to include a node 101, an NMS 102 as one example of a network management system for receiving a path setting request from a client (not illustrated), performing a path search, and performing an instruction such as switching to each node 101, based on a result of the path search, and a coupling multicore erbium doped optical fiber amplifier (coupling MC-EDFA 401) as one example of a multicore optical fiber amplifier provided on a transmission path between the node 101 and the node 101. The coupling MC-EDFA 401 of the network according to the present example embodiment may use any configuration of the coupling MC-EDFA according to the first to third example embodiments described above.

Operation in Fourth Example Embodiment

Figure 15:
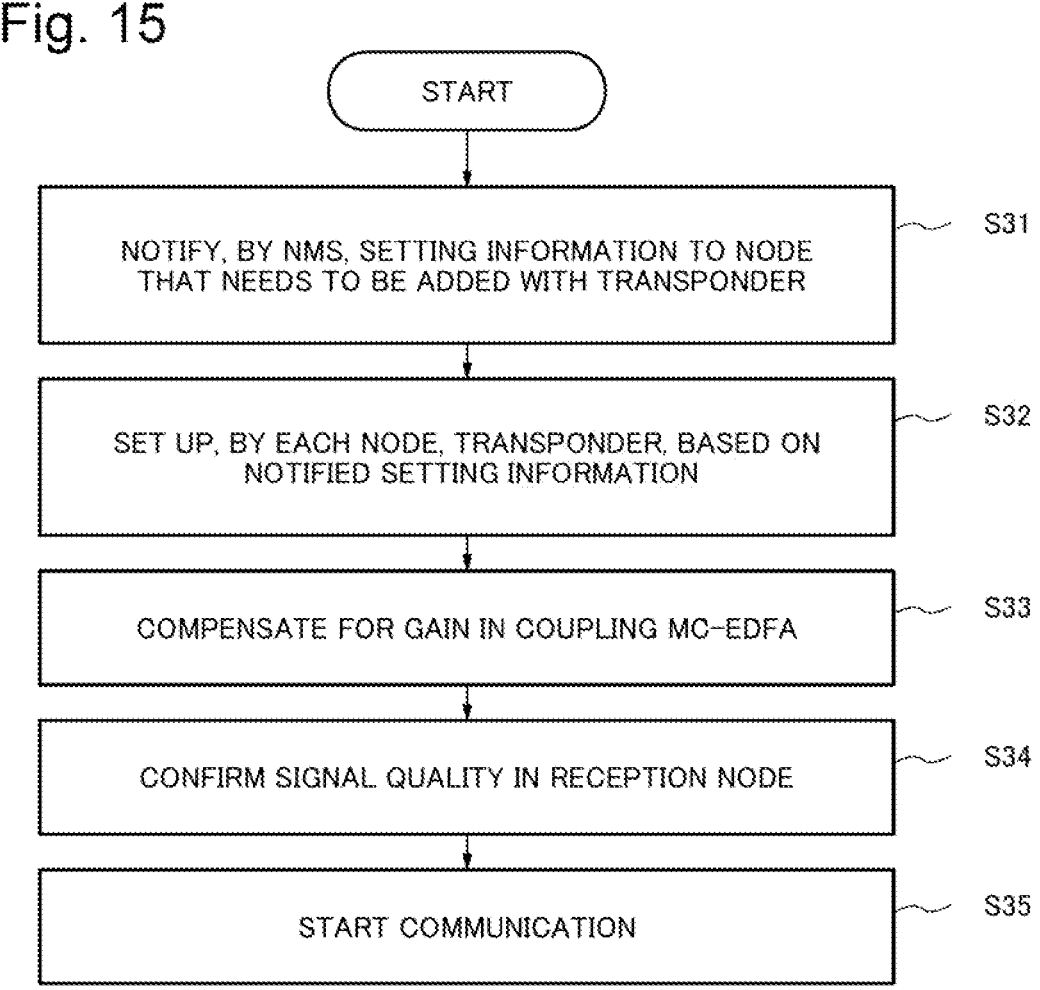
FIG. 15 is a flowchart illustrating an operation in the fourth example embodiment.

Next, an operation of the optical communication network according to the present example embodiment, particularly an operation when a transponder is added to a node will be described by using FIGS. 14 and 15. FIG. 15 is a flowchart illustrating an operation for setting an optical communication network according to the present example embodiment. The NMS 120 notifies setting information such as the number of transponders to be added, a wavelength, and a modulation format to the node 101 that needs to be added with transponder (S31). Next, the node 101 notified of the setting information sets up the transponder, based on the notified setting information (S32). Note that a signal of an added transponder the transmission of which has started is amplified by the coupling MC-EDFA 401 installed on a transmission path, and an optical loss is compensated. In other words, a gain is compensated in the coupling MC-EDFA 401 (S33). Next, quality of the transmitted signal is confirmed in a reception node of nodes of the network (S34). When predetermined signal quality is satisfied as a result of the confirmation of the signal quality, the optical communication network starts communication of the signal between a transponder of a transmission node and a transponder of the reception node (S35).

Advantageous Effect of Fourth Example Embodiment

The optical communication network according to the present example embodiment adopts the coupling MC-EDFA according to the first to third example embodiments described above for the optical amplifier provided on the transmission path that connects between the nodes 101.

The coupling MC-EDFA according to the first to third example embodiments described above can also perform stable amplification in a multicore optical fiber amplifier having great crosstalk between cores, and thus achieves control in such a way as to set the same gain between cores. The optical communication network according to the example embodiment of the present invention using such an optical amplifier can perform stable communication setting.

Example Embodiment of Superordinate Concept

Figure 16:
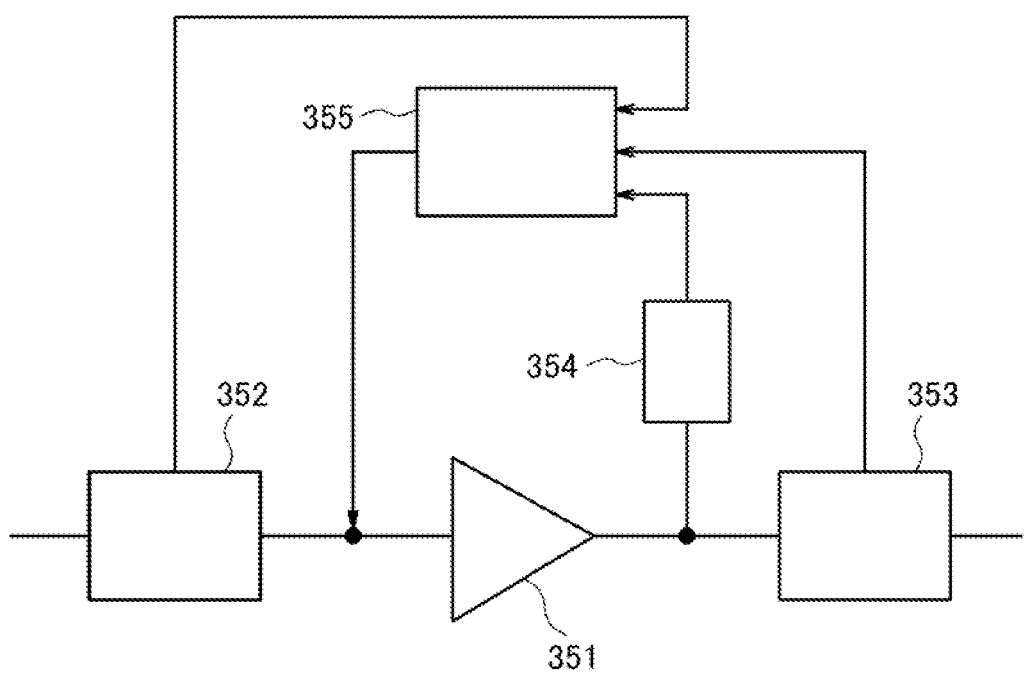
FIG. 16 is a configuration diagram of an optical amplifier according to an example embodiment of a superordinate concept.

Next, an optical amplifier according to an example embodiment of a superordinate concept of the present invention will be described with reference to FIG. 16. FIG. 16 is a configuration diagram of an optical amplifier according to the example embodiment of the superordinate concept. Similarly to the detailed example embodiments described above, the optical amplifier according to the present example embodiment is an optical amplifier using, as a gain medium 351, a multicore optical fiber including a plurality of cores. The optical amplifier in FIG. 16 includes an input-light power monitor 352, an output-light power monitor 353, a crosstalk monitor 354, and a controller 355. The input-light power monitor 352 monitors optical power of input light to a plurality of cores of a multicore optical fiber. The output-light power monitor 353 monitors optical power of output light, from the plurality of cores, that has passed through the multicore optical fiber and has passed through the gain medium 351. The crosstalk monitor 354 monitors a crosstalk amount between cores among the plurality of cores. The controller 355 controls pumping light power of pumping light superimposed on input light to the plurality of cores, based on the monitored optical power of the input light, the monitored optical power of the output light, and the monitored crosstalk amount between the cores.

The optical amplifier according to the present example embodiment controls pumping light power injected to each core, from input light power to each core, output light power that has passed through the gain medium 351, and a crosstalk amount acquired from residual pumping light power. In this way, stable amplification can also be performed in a multicore optical fiber amplifier having great crosstalk between cores. In this way, control can be performed in such a way as to set the same gain between cores.

Furthermore, the optical communication network according to the example embodiment of the present invention using such an optical amplifier can perform stable communication setting.

Other Example Embodiment

Although some example embodiments have been described above as preferable example embodiments of the present invention, the present invention is not limited to the example embodiments.

For example, in the example embodiment described above, description is given with an erbium ion doped optical fiber (EDF) as one example of an impurity ion doped optical fiber and with an erbium ion doped optical fiber amplifier (EDFA) as one example of an impurity ion doped optical fiber amplifier, but is not limited thereto. The present invention can also be formed by using an impurity ion doped optical fiber and an impurity ion doped optical fiber amplifier in which a rare-earth element other than erbium such as ytterbium (Yb), neodymium (Nd), and thulium (Tm), for example, is doped as an amplification medium. An impurity ion doped optical fiber and an impurity ion doped optical fiber amplifier can be formed by selecting a rare-earth element ion to be added to an optical fiber according to a wavelength band of signal light to be transmitted.

The third example embodiment described above is described with the configuration diagram to which the pump table 311 is added similarly to the second example embodiment, but the pump table 311 may be omitted when a merit by the pump table 311 is not desired.

The whole or part of the example embodiments disclosed above can be described as, but not limited to, the following supplementary notes.

(Supplementary Note 1)

An optical amplifier using, as a gain medium, a multicore optical fiber including a plurality of cores, the optical amplifier including:
- an input-light power monitor that monitors optical power of input light to the plurality of cores of the multicore optical fiber;
- an output-light power monitor that monitors optical power of output light, from the plurality of cores, that has passed through the multicore optical fiber and has passed through a medium;
- a crosstalk monitor that monitors a crosstalk amount between cores among the plurality of cores; and
- a controller that controls pumping light power of pumping light to be superimposed on input light to the plurality of cores, based on the monitored optical power of the input light, the monitored optical power of the output light, and the monitored crosstalk amount between the cores.

(Supplementary Note 2)

The optical amplifier according to supplementary note 1, wherein the crosstalk monitor measures a crosstalk amount of pumping light from residual pumping light power separated from a main signal of output light from the plurality of cores, and monitors a crosstalk amount between the cores.

(Supplementary Note 3)

The optical amplifier according to supplementary note 1 or 2, further including a coupler that superimposes the pumping light on input light to the plurality of cores.

(Supplementary Note 4)

The optical amplifier according to any one of supplementary notes 1 to 3, wherein the controller controls pumping light power of the pumping light, based on a relationship among a gain of the optical amplifier, a gain coefficient, and pumping light power of the pumping light.

(Supplementary Note 5)

The optical amplifier according to supplementary note 4, further including
- a pump table acquired by tabulating the gain coefficient and pumping light power of the pumping light, wherein the controller controls pumping light power of the pumping light by referring to the pump table.

(Supplementary Note 6)

The optical amplifier according to any one of supplementary notes 1 to 5, further including an equalizer that cuts a surplus gain of output light from the plurality of cores.

(Supplementary Note 7)

The optical amplifier according to any one of supplementary notes 1 to 6, wherein the controller controls pumping light power of pumping light to be superimposed on input light to the plurality of cores in such a way that a crosstalk amount between the cores is substantially same and a minimum gain of the optical amplifier becomes equal to or more than a desired gain.

(Supplementary Note 8)

The optical amplifier according to any one of supplementary notes 1 to 7, wherein the crosstalk monitor recognizes a wavelength difference between pumping light sources with different wavelengths in each core, and measures the crosstalk amount.

(Supplementary Note 9)

The optical amplifier according to any one of supplementary notes 1 to 7, wherein the crosstalk monitor recognizes a frequency difference between pumping light sources having pumping light on which signals at different frequencies are superimposed, and measures the crosstalk amount.

(Supplementary Note 10)

An optical communication network including an optical communication apparatus as a node, an optical transmission path that connects between the optical communication apparatuses, a network management system that controls the optical communication apparatus, and the optical amplifier according to any one of supplementary notes 1 to 9 that is provided on the optical transmission path, and amplifies an optical signal.

(Supplementary Note 11)

A control method for an optical amplifier using, as a gain medium, a multicore optical fiber including a plurality of cores, the control method including:
- monitoring optical power of input light to the plurality of cores of the multicore optical fiber;
- monitoring optical power of output light, from the plurality of cores, that has passed through the multicore optical fiber and has passed through a medium;
- monitoring a crosstalk amount between cores among the plurality of cores; and
- controlling pumping light power of pumping light to be superimposed on input light to the plurality of cores, based on the monitored optical power of the input light, the monitored optical power of the output light, and the monitored crosstalk amount between the cores.

(Supplementary Note 12)

The control method for an optical amplifier according to supplementary note 11, further including measuring a crosstalk amount of pumping light from residual pumping light power separated from a main signal of output light from the plurality of cores, and thus monitoring a crosstalk amount between the cores.

(Supplementary Note 13)

The control method for an optical amplifier according to supplementary note 11 or 12, further including controlling pumping light power of the pumping light, based on a relationship among a gain of the optical amplifier, a gain coefficient, and pumping light power of the pumping light.

(Supplementary Note 14)

The control method for an optical amplifier according to supplementary note 13, further including referring to a pump table acquired by tabulating the gain coefficient and pumping light power of the pumping light, and controlling pumping light power of the pumping light.

(Supplementary Note 15)

The control method for an optical amplifier according to any one of supplementary notes 11 to 14, further including cutting a surplus gain of output light from the plurality of cores.

(Supplementary Note 16)

The control method for an optical amplifier according to any one of supplementary notes 11 to 15, further including controlling pumping light power of pumping light to be superimposed on input light to the plurality of cores in such a way that a crosstalk amount between the cores is substantially same and a minimum gain of the optical amplifier becomes equal to or more than a desired gain.

(Supplementary Note 17)

The control method for an optical amplifier according to any one of supplementary notes 11 to 16, further including recognizing a wavelength difference between pumping light sources with different wavelengths in each core, and measuring the crosstalk amount.

(Supplementary Note 18)

The control method for an optical amplifier according to any one of supplementary notes 11 to 16, further including recognizing a frequency difference between pumping light sources having pumping light on which signals at different frequencies are superimposed, and measuring the crosstalk amount.

(Supplementary Note 19)

A control method for an optical communication network including an optical communication apparatus as a node, an optical transmission path that connects between the optical communication apparatuses, a network management system that controls the optical communication apparatus, and the optical amplifier according to any one of supplementary notes 1 to 9 that is provided on the optical transmission path, and amplifies an optical signal, the control method including:

adding an apparatus to an optical communication apparatus as a transmission node among the optical communication apparatuses as the nodes;

then controlling a gain of the optical amplifier by controlling pumping light power of pumping light superimposed on input light to the plurality of cores, based on the monitored optical power of the input light, the monitored optical power of the output light, and the monitored crosstalk amount between the cores;

transmitting signal light from the optical communication apparatus as the transmission node to an optical communication apparatus as a reception node via the optical transmission path, and confirming signal quality by the optical communication apparatus as the reception node; and starting communication between the optical communication apparatus as the transmission node and the optical communication apparatus as the reception node.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2019-30342, filed on Feb. 22, 2019, the disclosure of which is incorporated herein in its entirety by reference.

REFERENCE SIGNS LIST

101 Node
102 NMS
201 Optical transmission path
202 Division/insertion port
203 Optical switch that compensates for loss of optical transmission path
204 Transponder-side port
205 Multicast optical switch
206 Transponder
207 Node controller
208 Optical amplifier
301 Coupling MC-EDF
302 SMF
303 FI
304 FO
305 SM-LD
306, 309 WDM coupler
307a Input-light power monitor
307b Output-light power monitor
308 Crosstalk monitor
310, 310a Controller
311 Pump table
312 Equalizer
401 Coupling MC-EDFA

What is claimed is:

1. An optical amplifier using, as a gain medium, a multicore optical fiber including a plurality of cores, the optical amplifier comprising:

an input-light power monitor that monitors optical power of input light to the plurality of cores of the multicore optical fiber;

an output-light power monitor that monitors optical power of output light, from the plurality of cores, that has passed through the multicore optical fiber and has passed through a medium;

a crosstalk monitor that monitors a crosstalk amount between cores among the plurality of cores; and a controller that controls pumping light power of pumping light to be superimposed on input light to the plurality of cores, based on the monitored optical power of the input light, the monitored optical power of the output light, and the monitored crosstalk amount between the cores.

2. The optical amplifier according to claim 1, wherein the crosstalk monitor measures a crosstalk amount of pumping light from residual pumping light power separated from a main signal of output light from the plurality of cores, and monitors a crosstalk amount between the cores.

3. The optical amplifier according to claim 1, further comprising a coupler that superimposes the pumping light on input light to the plurality of cores.

4. The optical amplifier according to claim 1, wherein the controller controls pumping light power of the pumping light, based on a relationship among a gain of the optical amplifier, a gain coefficient, and pumping light power of the pumping light.

5. The optical amplifier according to claim 4, further comprising
a pump table acquired by tabulating the gain coefficient and pumping light power of the pumping light, wherein the controller controls pumping light power of the pumping light by referring to the pump table.

6. The optical amplifier according to claim 1, further comprising an equalizer that cuts a surplus gain of output light from the plurality of cores.

7. The optical amplifier according to claim 1, wherein the controller controls pumping light power of pumping light to be superimposed on input light to the plurality of cores in such a way that a crosstalk amount between the cores is substantially same and a minimum gain of the optical amplifier becomes equal to or more than a desired gain.

8. The optical amplifier according to claim 1, wherein the crosstalk monitor recognizes a wavelength difference between pumping light sources with different wavelengths in each core, and measures the crosstalk amount.

9. The optical amplifier according to claim 1, wherein the crosstalk monitor recognizes a frequency difference between pumping light sources having pumping light on which signals at different frequencies are superimposed, and measures the crosstalk amount.

10. An optical communication network comprising:
an optical communication apparatus as a node;
an optical transmission path that connects between the optical communication apparatuses;
a network management system that controls the optical communication apparatus; and
the optical amplifier according to claim 1 that is provided on the optical transmission path, and amplifies an optical signal.

11. A control method for an optical amplifier using, as a gain medium, a multicore optical fiber including a plurality of cores, the control method comprising:
monitoring optical power of input light to the plurality of cores of the multicore optical fiber;
monitoring optical power of output light, from the plurality of cores, that has passed through the multicore optical fiber and has passed through a medium;
monitoring a crosstalk amount between cores among the plurality of cores; and
controlling pumping light power of pumping light to be superimposed on input light to the plurality of cores, based on the monitored optical power of the input light, the monitored optical power of the output light, and the monitored crosstalk amount between the cores.

12. The control method for an optical amplifier according to claim 11, further comprising measuring a crosstalk amount of pumping light from residual pumping light power separated from a main signal of output light from the plurality of cores, and thus monitoring a crosstalk amount between the cores.

13. The control method for an optical amplifier according to claim 11, further comprising controlling pumping light power of the pumping light, based on a relationship among a gain of the optical amplifier, a gain coefficient, and pumping light power of the pumping light.

14. The control method for an optical amplifier according to claim 13, further comprising referring to a pump table acquired by tabulating the gain coefficient and pumping light power of the pumping light, and controlling pumping light power of the pumping light.

15. The control method for an optical amplifier according to claim 11, further comprising cutting a surplus gain of output light from the plurality of cores.

16. The control method for an optical amplifier according to claim 11, further comprising controlling pumping light power of pumping light to be superimposed on input light to the plurality of cores in such a way that a crosstalk amount between the cores is substantially same and a minimum gain of the optical amplifier becomes equal to or more than a desired gain.

17. The control method for an optical amplifier according to claim 11, further comprising recognizing a wavelength difference between pumping light sources with different wavelengths in each core, and measuring the crosstalk amount.

18. The control method for an optical amplifier according to claim 11, further comprising recognizing a frequency difference between pumping light sources having pumping light on which signals at different frequencies are superimposed, and measuring the crosstalk amount.

19. A control method for an optical communication network including an optical communication apparatus as a node, an optical transmission path that connects between the optical communication apparatuses, a network management system that controls the optical communication apparatus, and the optical amplifier according to claim 11 that is provided on the optical transmission path, and amplifies an optical signal, the control method comprising:
adding an apparatus to an optical communication apparatus as a transmission node among the optical communication apparatuses as the nodes;
then controlling a gain of the optical amplifier by controlling pumping light power of pumping light superimposed on input light to the plurality of cores, based on the monitored optical power of the input light, the monitored optical power of the output light, and the monitored crosstalk amount between the cores;
transmitting signal light from the optical communication apparatus as the transmission node to an optical communication apparatus as a reception node via the optical transmission path, and confirming signal quality by the optical communication apparatus as the reception node; and
starting communication between the optical communication apparatus as the transmission node and the optical communication apparatus as the reception node.

* * * * *